United States Patent [19]

Rupp

[11] Patent Number: 4,544,482

[45] Date of Patent: Oct. 1, 1985

[54] APPARATUS FOR EXTRACTING MAGNETIZABLE PARTICLES FROM A FLUID MEDIUM

[75] Inventor: Güenter Rupp, Rathsberg, Fed. Rep. of Germany

[73] Assignee: Siemens Aktiengesellschaft, Berlin and Munich, Fed. Rep. of Germany

[21] Appl. No.: 560,662

[22] Filed: Dec. 12, 1983

[30] Foreign Application Priority Data

Dec. 22, 1982 [DE] Fed. Rep. of Germany ....... 3247522

[51] Int. Cl.[4] ............ B01D 35/06

[52] U.S. Cl. ............ 210/222; 55/100; 209/224; 210/489

[58] Field of Search ............ 210/222, 223, 695, 252, 210/335, 489; 55/3, 100; 209/214, 232, 224

[56] References Cited

U.S. PATENT DOCUMENTS

| | | | |
|---|---|---|---|
| 3,567,026 | 3/1971 | Kolm | 210/222 |
| 4,147,632 | 4/1979 | Oder | 210/222 |

FOREIGN PATENT DOCUMENTS

| | | | |
|---|---|---|---|
| 1277488 | 9/1968 | Fed. Rep. of Germany . | |
| 2628095 | 11/1980 | Fed. Rep. of Germany . | |
| 45777 | 4/1977 | Japan | 209/232 |
| 154873 | 12/1979 | Japan | 210/222 |
| 24537 | 2/1980 | Japan | 210/223 |
| 106510 | 8/1980 | Japan | 210/223 |
| 1578396 | 11/1980 | United Kingdom | 210/222 |

OTHER PUBLICATIONS

Portis, Alan M., *Electromagnetic Fields: Sources and Media,* (1978), pp. 207–212.

H. Pfister, Section 1: Magnetic Separation, Magnetische Separation Mit Hohen Flussdichte-Gradienten, High Gradient Magnetic Separation, 8/8/79, pp. 1–10.

*Primary Examiner*—Richard V. Fisher

*Assistant Examiner*—W. Gary Jones

*Attorney, Agent, or Firm*—Karl F. Milde, Jr.

[57] ABSTRACT

The device using high-gradient magnetic separation techniques to extract magnetizable particles from a flowing medium contains a filter structure which has several wire nets made of non-corroding, ferromagnetic material with a predetermined mesh width and wire gauge. These nets are arranged, one behind the other, perpendicular to the direction of flow of the medium. The wire nets are subjected to a magnetic field that is either parallel or antiparallel to the direction of flow of the medium. In order to increase the rate of separation, particularly for particles of varying size and magnetizability, and the maintenance interval for this separation device, the filter structure is divided into at least two parts (10, 11) arranged one after the other along the direction of flow of the medium (M), with the magnetic flux density ($B_1$) present in the region of the first part (10) of the filter structure that is smaller than the magnetic flux denisty ($B_2$) present in the region of the second part (11) of the filter structure. At least the wires in the nets (14) at the end (16) of the device where the medium (M) enters the first part (10) of the filter structure have a heavier gauge than the wires of the nets (15) at the outlet end (17) where the medium (M') leaves the second part (11) of the filter structure.

11 Claims, 1 Drawing Figure

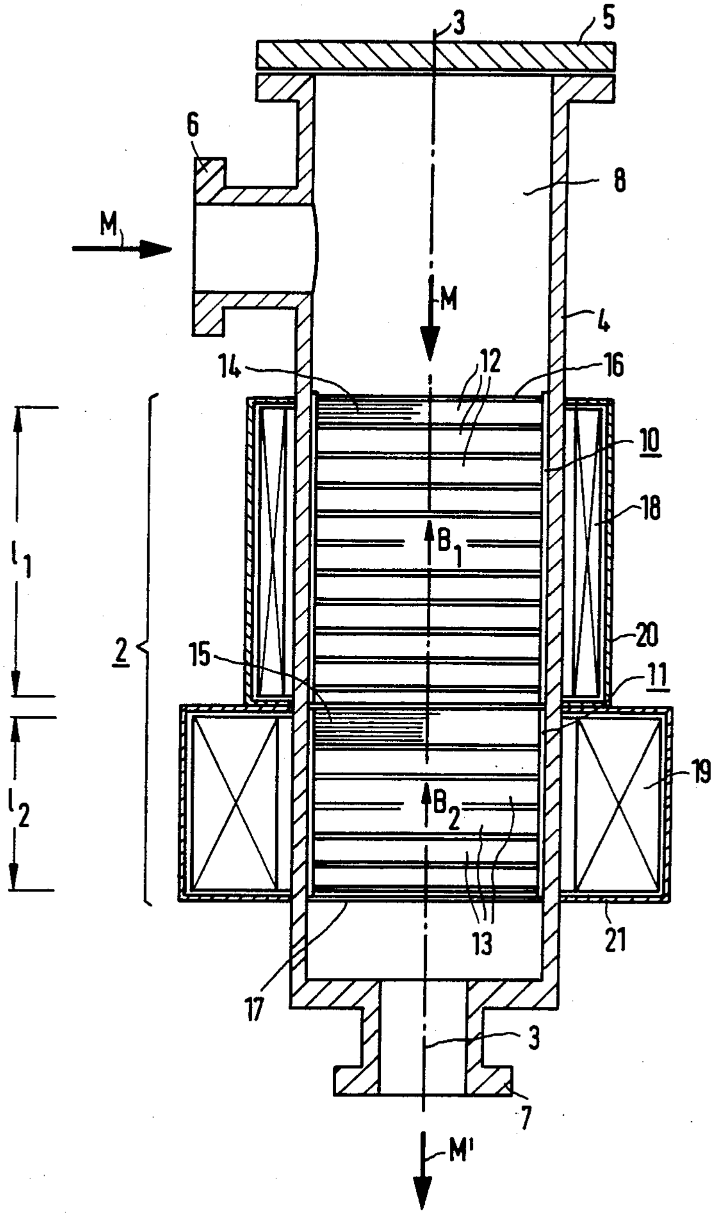
3
5
6
8
M
M
4
14
12
16
10
18
B1
l1
2
15
20
11
l2
B2
19
13
21
17
3
7
M'

APPARATUS FOR EXTRACTING MAGNETIZABLE PARTICLES FROM A FLUID MEDIUM

BACKGROUND OF THE INVENTION

The invention concerns a device using high-gradient magnetic separation techniques to extract magnetizable particles from a flowing fluid medium. The device includes a filter structure that contains a number of wire nets made of non-corroding, ferromagnetic material with a predetermined mesh width and wire gauge which are arranged at least approximately perpendicularly to the direction of flow of the medium and, viewed along the direction of flow, relatively close behind one another. The wire nets are placed in a magnetic field that is directed substantially parallel or antiparallel to the direction of flow of the medium.

A separation device of the type just described is disclosed in the German Pat. No. 26 28 095. In the magnetic separation process, advantage is taken of the fact that, in a suitably arranged magnetic field, a magnetizable particle is subject to a force that moves it or holds it in place against the other forces acting on it. The latter forces include, for example, the force of gravity or hydrodynamic forces of friction in a liquid medium. Separation processes of this kind are intended, for example, for steam or cooling-water circuits in both conventional and nuclear power plants. Particles, which have usually been produced by corrosion, are suspended in the liquid or gaseous medium in these circuits. It is difficult to remove these particles from the medium with the aid of a magnetic separation process, however, because they differ greatly in their chemical composition, their particle size and their magnetizability. For example, the corrosion products in the secondary circuit of a nuclear power plant consist of various iron oxides, of which the largest part by weight is ferrimagnetic magnetite ($Fe_3O_4$), the second largest is antiferromagnetic hematite ($\alpha$-$Fe_2O_3$) and the remainder consist of paramagnetic hydroxides.

Mechanical separation devices that retain particles as a result of the small pore width of their filter matrices are indeed not affected in terms of efficiency by the chemical composition and the magnetic properties of the particles; however, there are two main difficulties with these devices: In the first place, the loaded filter matrices can be cleaned only with relative difficulty, so that in most cases they can be used only as fairly expensive disposable filters. In the second place, when the flow-through rate is high, these filter matrices take up a great deal of space, because the filtering surface must be correspondingly enlarged.

With the so-called "ball-filters" that are known in the art (cf., e.g., German Pat. No. 1,277,488) it is possible as a general rule to extract only easily magnetizable particles, in other words, primarily ferromagnetic ones. A device of this kind contains a cylindrical filter holder which is filled with balls made of magnetically soft iron. These are exposed to a magnetic field generated by an electric coil surrounding the filter holder. By means of this magnetic field in connection with the balls, sufficiently high field-strength gradients are obtained to accumulate, at the magnetic poles of the balls, the ferromagnetic particles that are being carried along in the liquid flowing through the filter. The balls are subsequently demagnetized in order to clean the filter. As far as the particles with lower magnetizability is concerned, however, the rate of separation achieved by this familiar device—is other words, the ratio of the concentration in suspended material removed by the ball filter to the corresponding concentration before entry into the filter—is relatively small. The smallest ferromagnetic particles, as well as weakly magnetic (i.e., antiferromagnetic or paramagnetic) particles can be effectively filtered out from a flowing medium by magnetic means only by using separation devices based on the so-called "high-gradient magnetic separation" technique ("HGM" technology) (cf., e.g., "Journal of Magnetism and Magnetic Materials" Vol. 13, 1979, pages 1 to 10). An HGM separation device of this kind is described in the German Pat. No. 26 28 095, referred to above. It contains, in a central filtering space, a filter structure consisting of a number of wire nets, which, viewed along the direction of flow, are placed in a stack relatively close behind one another and arranged perpendicularly to the direction of flow of the medium in a relatively strong magnetic field. This magnetic field is directed in parallel or antiparallel to the direction of flow of the medium in the area of the filter structure and generates there, for example, a magentic induction on the order of 1 Tesla. The wires which form the nets are made of ferromagnetic material and are of very small gauge—for example, less than 0.1 mm. The magnetic field gradients generated in these nets are consequently very high, so that even weakly magnetizable particles can be filtered out. Experience has shown, however, that in circuits with particles suspended in a medium that are of widely differing particle size and magnetizability, the wire nets of this type of separation device become loaded relatively quickly on the inflow side, while only comparatively small quantities are extracted at the nets that are farther along the line of flow. The rate of separation and the maintenance interval—in other words, the period of time between two required cleaning processes—are correspondingly limited for this separation device.

SUMMARY OF THE INVENTION

The purpose of the present invention is therefore to improve an HGM separation device in such a way that its rate of separation and its maintenance interval are increased.

This purpose is achieved, according to the invention, by dividing the filter structure into at least two parts, arranged one after the other along the direction of flow of the medium with the magnetic flux density present in the region of the first part of the filter structure being smaller than the magnetic flux density present in the region of the second part of the filter structure. At least the wires in the wire nets at the inlet end of the particle separation device, where the medium enters the first part of the filter structure, are made with a heavier gauge than the wires of the wire nets at the outlet end, where the medium leaves the second part of the filter structure.

In the separation device according to the invention, the first part of the filter structure therefore has a low field strength, and the easily magnetizable particles are picked up in its volume. The second part of the filter structure with the high field strength is then reserved for the extraction of weakly magnetizable particles. By variation of the wire gauge in the nets of the two filter structures, allowance is made for the fact that the particles to be separated differ with respect to their size and magnetizability. The provision of two or three magnetic field strength zones and a gradation of the wire diameter, according to the invention, produce a more even distribution of the extracted particles over the entire filter volume. The advantages connected with this design of the separation device in accordance with the invention thus consist, in particular, in (1) a relatively high rate of separation, (2) a very slightly increasing pressure gradient along the filter from inlet to outlet, and (3) a long maintenance interval for the filter structure.

For further explanation of the invention and its variations and refinements, reference is made to the drawing, which illustrates a separation device in accordance with the invention, and to the following description.

BRIEF DESCRIPTION OF THE DRAWING

The single FIGURE is a lengthwise cross-section of HGM separation apparatus according to a preferred embodiment of the present invention.

DESCRIPTION OF THE PREFERRED EMBODIMENTS

The separation device according to the invention, designated generally in the FIGURE by the reference numeral 2, includes a container or housing 4, which is roughly rotationally symmetrical with respect to an axis 3, and is made of non-magnetic material, such as stainless steel. This housing, which may, for example, be positioned vertically, is sealed at its upper face by means of a flange cover 5 and has, in the adjoining section of its outer surface, a lateral connecting flange 6. The lower end of the container is in the shape of a central flange 7. A medium M, in which are suspended the particles to be filtered out, may be introduced in the interior 8 of the housing, through the lateral connecting flange 6, while the filtered medium, designated as M', is withdrawn from the housing 4 through the flange 7.

For the separation, two parts 10 and 11 of the filter structure, arranged one after the other along the direction of flow, have been provided in the interior 8 of the housing 4. In this case the first part 10 of the filter structure has a filter volume corresponding to a predetermined length $l_1$, while the filter volume of the second part 11 of the filter structure, which extends over the comparatively shorter length $l_2$, is correspondingly smaller. The lengths $l_1$ and $l_2$ preferably bear approximately the same relationship to one another as the quantity $m_1$ of the easily magnetizable—i.e., ferromagnetic and ferrimagnetic—particulate impurities in the medium M that is to be filtered to the quantity $m_2$ of the other particles that are more difficult to magnetize. In other words the relationship of the lengths $l_1$ and $l_2$ should preferably be defined by the following equation:

$$l_1/l_2 \approx m_1/m_2$$

Each of the two parts 10 and 11 of the filter structure is made up of a predetermined number of filter elements 12 and 13, respectively, which may each have the same width dimension in the direction of flow, so that the ratio of the number of the elements 12 of part 10 of the filter structure to the number of the elements 13 of part 11 of the filter structure is roughly the same as the ratio of $l_1$ to $l_2$. Each of these filter elements has a holding frame designed, for example, as a hollow cylinder, so that it can receive a large number (at least 50, but preferably over 100) screens or nets—in particular, so-called "net rounds or net rondes"—arranged closely adjacent, one behind the other along the direction of flow. In the FIGURE, only a portion of the nets belonging to each one of the filter elements 12 and 13 is indicated roughly by the lines 14 and 15, respectively. The nets are made of extremely fine wire of non-corroding, ferromagnetic material, for example, of stainless steel, and have a predetermined mesh width. In this case the nets are held in the individual filter elements 12, 13 (or in the individual parts 10 and 11 of the filter structure) in such a manner that they are perpendicular to the direction of flow of the medium M in the housing 4. The adjacent nets 14 and 15 in the filter elements 12 and 13 in this case are either separated by an approximately equal small interval of about one millimeter, or are placed directly against one another. As noted above the filter volume of the first part 10 of the filter structure contains a greater number of nets 14, corresponding to the ratio of $l_1$ to $l_2$, than does the filter volume of the second part 11 of the filter structure. It is, however, also possible to have the distances of the nets from one another graduated within a filter element 12, 13 and/or from filter element to filter element. In the latter case a greater packing density of the nets is generally provided at the outlet end of the respective filter structure part than at the corresponding inflow side.

According to the invention, the gauge of the wires in the nets 14 at the inflow end 16 of the first part 10 of the filter structure is heavier than the gauge of the wires of the nets 15 at the outlet end 17 of the second part 11 of the filter structure. In this case, the nets 14 of the first part of the filter structure and/or the nets 15 of the second part of the filter structure may have the same wire gauge throughout the respective part. However, it is especially advantageous if the wire gauges in each filter structure part vary along the direction of flow of the medium M in such a manner that the coarser wires are arranged at the respective inlet and the finer ones at the respective outlet ends. By this means, allowance is made in both parts of the filter structure for the fact that the particles to be separated can vary with respect to their size and magnetizability. It is preferable to choose the wire gauge for the nets 14 at the inflow end 16 of the first part 10 of the filter structure to be at least twice as heavy as the wire gauge of the last nets 15 at the outlet end 17 of the second part 11. For instance, the nets 14 of all the filter elements 12 can have one uniform wire gauge, while the nets 15 of the filter elements 13 have another wire gauge that is smaller by a predetermined amount. In addition, in at least one of the parts 10 and 11 of the filter structure—for example, in part 11 only—the wire gauge can also be varied along the direction of flow from heavier to finer.

As an example, the gauge of the wires in the nets 14 of the first part 10 of the filter structure is less than 0.4 mm and preferably about 0.2 mm, while the wire gauge of the nets 15 of the following part 11 of the filter structure, is equal to or less than 0.1 mm. In addition, the nets 14 of the filter elements 12 and/or the nets 15 of the filter elements 13 can also be graduated with respect to their mesh width in such a manner that the nets with the larger mesh width are arranged in each case at the inflow end and the nets with the smaller mesh width are arranged at the outlet end. In this case, mesh widths between 1.0 mm and 0.1 mm are generally provided for the nets 14 and 15.

As may also be seen from the FIGURE, the first part 10 of the filter structure is to be exposed to a substantially homogeneous magnetic field that is directed either in parallel or antiparallel to the direction of flow of the medium M. This magnetic field is generated by a magnetic coil 18 wrapped around the housing 4 in the area of part 10 of the filter structure, and produces in this part of the filter structure a magnetic flux density $B_1$, indicated by the arrow, which is generally between 0.01 Tesla and 0.1 Tesla. The second filter structure 11 is likewise surrounded by a magnetic coil 19, which is designed for a magnetic flux density $B_2$ of approximately 0.1–1.0 Tesla. In accordance with the invention, the flux density $B_1$ produced in part 10 of the filter structure by the coil 18 should be lower than, and preferably not more than half as large as, the flux density $B_2$ that is generated by the coil 19 in the following part 11 of the filter structure. In order to concentrate the magnetic fields produced by the coils 18 and 19 essentially in the area of the respective parts 10 and 11 of the filter structure, each of these coils is also enclosed in an iron sheath 20 and 21, respectively, in such a manner that only the side of the coil facing the respective part of the filter structure remains open.

Pursuant to a particular, preferred embodiment of the separation device in accordance with the invention, as shown in the FIGURE, for a flow-through of about 100 metric tons of liquid per hour, the housing 4, made of non-magnetic stainless steel, has an inner diameter of about 400 mm and a wall thickness of 5 mm. The first part 10 of the filter structure includes, over its length $l_1$ of about 500 mm, about 1,000 "net rounds" 14 made of non-corroding ferromagnetic stainless steel that are stacked directly on top of one another in eleven filter elements 12. In this case, at the inflow end 16 of part 10 of the filter structure, net rounds 14 with wire gauges of 0.2 mm and mesh widths of about 1 mm are provided, while at the outlet end of part 10 of the filter structure, which faces part 11 of the filter structure, the net rounds 14 consist of wires with a gauge of 0.1 mm and mesh widths of 0.2 mm. The following part 11 of the filter structure contains, over a length $l_2$ of about 250 mm, about 500 net rounds 15 lying on top of one another in six filter elements 13. At the inflow end, which faces part 10 of the filter structure, the net rounds 15 have wire gauges of about 0.1 mm and mesh widths of 0.2 mm, while at the outlet end 17, the net rounds have wire gauges of 0.05 mm and mesh widths of 0.1 mm. In this case, within the two parts, 10 and 11, of the filter structure, the values for the wire gauges and mesh widths are graduated between the values for the respective inflow and outlet ends. The coil 18 is designed to generate a magnetic flux density $B_1$ of 0.05 Tesla, and the coil 19 a magnetic flux density $B_2$ of about 0.2 Tesla. With a device designed in this way, water that is contaminated with a corrosion product of about 10 ppb Fe with a composition of roughly 60% magnetite, 33% hematite, and 7% hydroxide can then be purified with a rate of separation of about 95%. The maintenance interval for a filter of this kind is about 1 year. In this embodiment, $l_1/l_2=2$, while $m_1/m_2$ is approximately 1.5.

There has thus been shown and described a device using high-gradient magnetic separation techniques which fulfills all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. Apparatus for high gradient magnetic separation of magnetizable particles from a flowing, fluid medium comprising, in combination:

(a) a first filter housing part having means defining a first inlet and a first outlet for said fluid medium;

(b) a plurality of first wire nets made of non-corroding, ferromagnetic material each having a predetermined mesh width and wire gauge, said first wire nets being arranged in said first filter housing part substantially perpendicularly to the direction of flow of said fluid medium and disposed relatively closely, one behind the other, as viewed in said direction of flow;

(c) means for generating a first substantially homogeneous magnetic field with a first flux density in the region of said first wire nets and directed substantially either in parallel or antiparallel with said direction of flow of said fluid medium in said first filter housing part;

(d) a second filter housing part having means defining a second inlet and a second outlet for said fluid medium, said second inlet being connected to said first outlet to receive said fluid medium from said first filter housing part;

(e) a plurality of second wire nets made of noncorroding, ferromagnetic material each having a predetermined mesh width and wire gauge, said second wire nets being arranged in said second filter housing part substantially perpendicularly to the direction of flow of said fluid medium and disposed relatively closely, one behind the other, as viewed in said direction of flow; and (f) means for generating a second substantially homogeneous magnetic field with a second flux density in the region of said second wire nets and directed substantially either in parallel or antiparallel with said direction of flow of said fluid medium in said second filter housing part;

wherein said second flux density of said second magnetic field is greater than said first flux density of said first magnetic field, and wherein the wire gauge of said first wire nets, at least in the vicinity of said first inlet where said fluid medium enters said first filter housing part, is heavier than the wire gauge of said second wire nets, at least in the vicinity of said second outlet where said fluid medium exits said second filter housing part.

2. The apparatus defined in claim 1, wherein said second flux density in said second filter housing part is at least twice as high as said first flux density in said first filter housing part.

3. The apparatus defined in claim 1, wherein said first wire nets of said first filter housing part all have the same wire gauge.

4. The apparatus defined in claim 1, wherein said second wire nets of said second filter housing part all have the same wire gauge.

5. The apparatus defined in claim 1, wherein the wire gauge of the wire nets in at least one of said filter housing parts decreases along the direction of flow.

6. The apparatus defined in claim 1, wherein in at least one of said filter housing parts the wire gauge of the wire nets at the inlet end is at least twice as large as the wire gauge of the wire nets at the outlet end.

7. The apparatus defined in claim 1, wherein the filter volume of said first filter housing part is larger than the filter volume of said second filter housing part.

8. The apparatus defined in claim 1, wherein said first and second filter housing parts each have a different number of wire nets.

9. The apparatus defined in claim 1, wherein the distances between adjacent wire nets are of varying values in at least one of said first and second filter housing parts.

10. The apparatus defined in claim 1, wherein the wire nets of at least one of said first and second filter housing parts have a larger mesh width at the inlet end than at the outlet end of the respective part.

11. The apparatus defined in claim 1, wherein at least some of the wire nets of said first filter housing part have larger mesh widths that the wire nets of said second filter housing part.

* * * * *